United States Patent

McGinnis

[15] 3,679,044
[45] July 25, 1972

[54] CONVEYOR BELT

[72] Inventor: Hebert E. McGinnis, Akron, Ohio

[73] Assignee: The B. F. Goodrich Company, New York, N.Y.

[22] Filed: Jan. 13, 1971

[21] Appl. No.: 106,158

[52] U.S. Cl................................................198/193, 198/201
[51] Int. Cl.....................................B65g 15/30, B65g 15/40
[58] Field of Search................198/191, 193, 201; 161/78, 161/86, 143, 144

[56] References Cited

UNITED STATES PATENTS 683,547  10/1901  Bowers..............................198/193 X Primary Examiner—Edward A. Sroka
Attorney—W. A. Ahira, Jr. and Joseph Januszkiewicz

[57] ABSTRACT

A conveyor belt for carrying bulk material while supported on troughing rolls has nearly inextensible longitudinal reinforcements in the edges only of the belt, above the margins of the transverse reinforcements. The belt is made of rubber or other elastomer of uniform thickness except at the edges which are substantially thickened on the top surface only, to contain the longitudinal reinforcements. The transverse reinforcements are preferably a spaced pair of fabrics, inextensible in the direction transverse of the belt but extensible longitudinally.

9 Claims, 2 Drawing Figures

Patented July 25, 1972

3,679,044

INVENTOR.
HEBERT E. McGINNIS
BY
W. A. Shira Jr.
ATTY.

CONVEYOR BELT

BACKGROUND

This invention relates to conveyor belts for carrying bulk material while supported on conventional troughing rolls. Such belts are required to be strong and almost inextensible in the longitudinal direction and to have a moderate stiffness transversely, so that the longitudinal driving loads will be sustained and the belts will bend into the desired trough shape while bridging the angles between the several troughing rolls in each group.

A great many combinations of reinforcing materials have been proposed to impart the desired properties to conveyor belts of rubber or other elastomers for carrying bulk materials, but the most satisfactory belts have continued to be those reinforced with multiple plies of woven fabrics, or a multi-ply woven fabric having a plurality of layers of longitudinal yarns, or, alternatively, uniformly spaced longitudinal cords or cables combined with a transverse stiffener. Such belts, when carefully made, track satisfactorily over the head and tail pulleys and the intervening idler rolls, but require closely spaced expensive troughing rolls to prevent spillage. One of the main factors leading to spillage seems to be the flattening of the belt between idlers brought about by the high tension required to drive such belts.

Attempts have been made to control spillage by adding upstanding rubber flanges to the edges of belts which are otherwise of conventional construction, but such flanges not only do not prevent transverse flattening between successive troughing idlers, but present other problems such as difficulties in passing around end pulleys, particularly if the flanges are high enough to be of significant benefit in preventing spillage.

In addition, proposals have been made to provide supports for conveyor belts omitting longitudinal reinforcements over a part or all of their width. Thus, so-called "cable belts," made without longitudinal tension members, ride on a pair of moving steel cables, which permits elimination of inclined troughing rolls but requires addition of separate sheaves for guiding and transmitting power to the cables. Other proposals are to omit some of the longitudinal reinforcement at a particular zone, such as an edge or the center of the belt, but the remaining reinforcement in such cases is of a conventional kind and located in a conventional relation to the transverse reinforcement.

SUMMARY

In accordance with this invention, the longitudinal reinforcements are concentrated in the very edges of the conveyor belts, and in a plane above that of the transverse reinforcements. Specifically, the belts of this invention have flanges or narrow thickened zones at their edges, above the margins of the transverse reinforcements, with the longitudinal reinforcements located in the upwardly projecting thickened edges. The transverse reinforcements preferably consist of a spaced pair of firm but flexible fabrics, resistant to transverse extension and compression, and extending completely across the belt under the longitudinal reinforcements.

These belts are easily manufactured, from components which are readily available and inexpensive. The separation of functions, with the longitudinal reinforcements concentrated in the edge zones, embedded in rubber strips distinct from the wear resisting cover, permits an economical use of material. The transverse reinforcements are required only to transmit the longitudinal driving forces to the load of bulk material and to supply the necessary strength and body to the actual load carrying surface, so that it will be properly supported by the end pulleys and troughing idlers together with the taut longitudinal reinforcements in the edges.

Above all, the belt permits much greater longitudinal spacing of troughing rolls than is generally considered possible, since none of the driving tension is applied in the load-carrying portion of the belt, so that the belt can and does hang from the longitudinal edge cables like a hammock, safely containing loads of greater bulk than can be safely carried on conventional conveyor belts, without spillage.

DRAWINGS

In the accompanying drawing, FIG. 1 is a perspective view of a short section of the load-carrying upper reach of one embodiment of the belt of this invention, showing how it is supported on conventional troughing rolls, along with a corresponding view of a section of the return run, showing how it is supported on plain cylindrical idler rolls.

FIG. 2 is an enlarged sectional view of a portion of the belt showing its internal construction.

DETAILED DESCRIPTION

Figure 1:
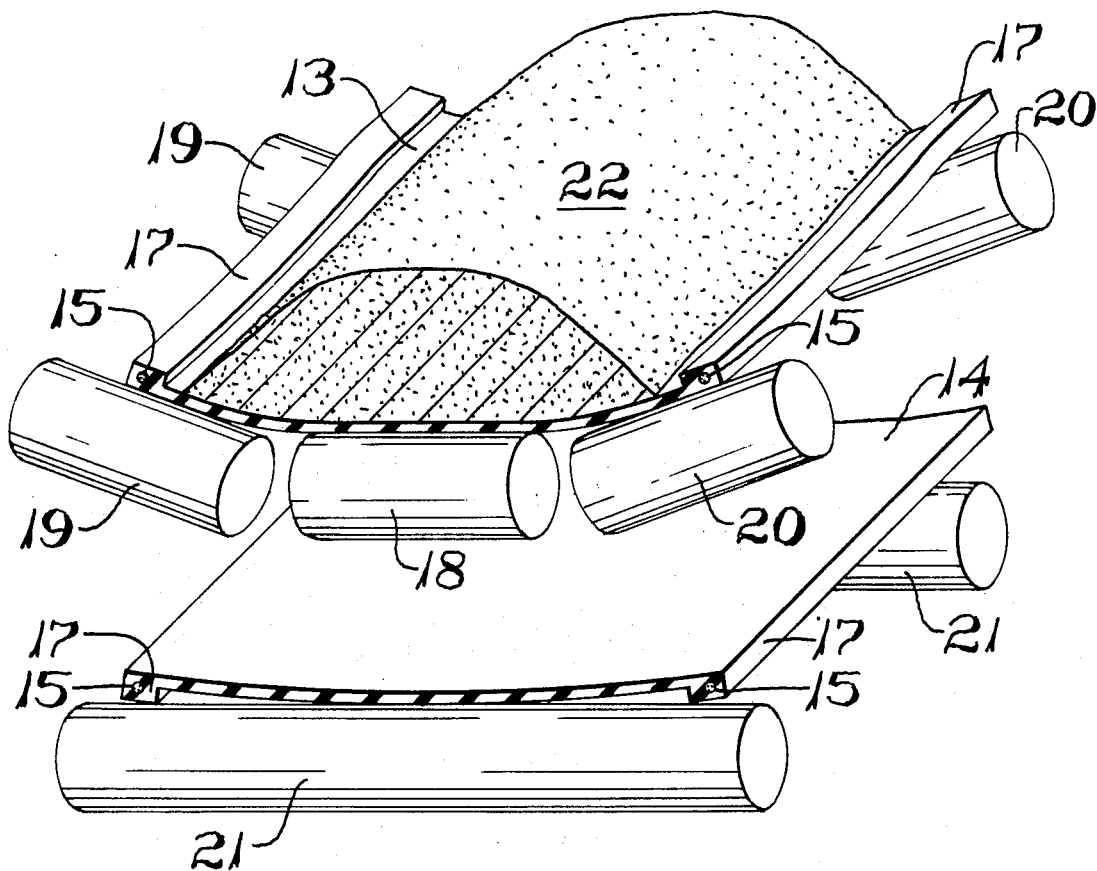
Figure 2:
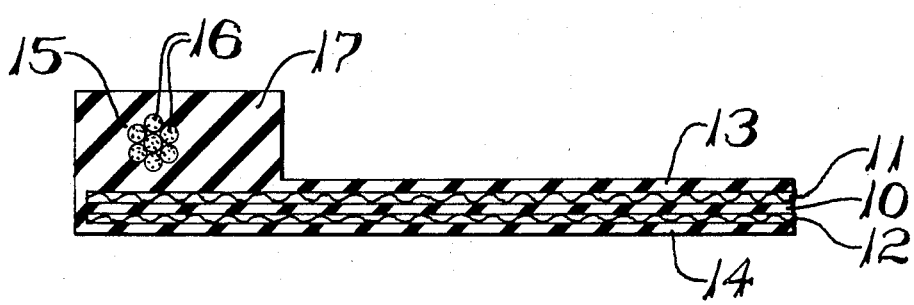

The belt of this invention has a body 10 of a suitable elastomer, which may be vulcanized rubber, or if a fireproof material is indicated it may be a plasticized polyvinyl chloride material, or may be of still other elastomers to meet special requirements. Embedded in the body 10 are lateral reinforcements or stiffeners which preferably take the form of a spaced pair of fabrics, an upper fabric 11 and a lower fabric 12, with the body material 10 separating them.

The fabric plies 11 and 12 should be of limited extensibility and compressibility in the transverse direction of the belt and of pronounced extensibility lengthwise. Their purpose is to support the load-carrying center of the belt from the longitudinal reinforcements and to provide the proper body or stiffness for smooth tracking over the supporting pulleys. The fabric plies 11 and 12 also have the purpose of transmitting driving forces to the load in going up steep inclines. These purposes are performed by making the fabric plies of material having strong and somewhat stiff and almost inextensible parallel yarns essentially free from crimp, extending transversely of the belt, and either no longitudinal yarns or those having substantial extensibility because of substantial crimp in the weave or because of being made from an extensible material.

Thus, the fabric plies 11 and 12 may be weftless or weak-wefted cord fabric, of strong cords of steel, glass, polyester filaments, rayon, or the like, such as are commonly used as tire cords. They can also be a woven cloth in which the weave has essentially all the crimp in the yarns which extend longitudinally of the belt, with uncrimped, nearly inextensible yarns in the transverse direction of the belt. It is presently preferred to use for each of the fabric plies 11 and 12 the kind of fabric consisting of one or more layers of strong firm uncrimped yarns in one direction held in place by highly crimped extensible yarns in the other direction. A suitable fabric of this kind which is extensively used in making certain known kinds of belts consists of two layers of strong firm uncrimped yarns in one direction, held in place in the two layers by extensible yarns in the other direction, some of the latter being straight yarns to maintain separation of the two layers and some being woven between the two layers. Such fabrics are easily impregnated with elastomers to prepare them for building into belts. When used as the fabric plies 11 and 12 respectively, they are prepared so that the essentially uncrimped nearly inextensible yarns extend transversely of the belt.

In building the belt, the elastomer-impregnated upper fabric 11 and lower fabric 12, separated by the body of elastomer 10, are provided with a wear resisting top cover 13 and bottom cover 14, which may be of the same material as the body 10 or a different elastomer of greater resistance to abrasive wear and other external influences.

The longitudinal reinforcement of the belt preferably consists of high strength steel cables 15 at the two edges of the belt. Each cable 15 is made up of strands 16 consisting of many fine wires. The cable is embedded in and bonded to a mass of elastomer 17 which is of sufficient size to surround the cable completely and protect it from wear and corrosion. This surrounding elastomer 17 containing the cable 15 is placed on top of the edge of the belt and bonded to the cover material 13, to form an upstanding flange, generally of greater width than height but of dimensions generally no greater than needed for convenient assembly and for mechanical protection of the cable.

A single cable 15 is shown in each edge, but if desired for increased flexibility or convenience or other reasons, more than one, say two, three, or four cables, may be used in each edge, in which case the dimensions of the elastomer flange 17 will be modified to accommodate the chosen size and number of cables.

The entire assembly is preferably subjected to heat and pressure in a platen press or other suitable equipment to consolidate and bond together all elements of the structure. If a vulcanizable elastomer is used, vulcanization will normally take place at the same time.

The new belt of this invention is intended for operation on conventional cylindrical (or slightly crowned) end pulleys or drums (not shown) together with spaced conventional troughing idler rolls such as the center roll 18, left hand troughing roll 19 inclined upward at a predetermined angle, and right hand troughing roll 20 inclined upward at an equal and opposite angle. The empty return run may be supported on conventional cylindrical rolls 21 of a length greater than the width of the belt, in which case the belt will ride in large part on the edge flanges 17, minimizing transfer of residual load from the carrying surface to the supporting roll. If preferred, a short roll may be used, which will fit between the two flanges 17, thus making the return run of the belt self-guiding.

It is found that when this new belt is used, it will carry a greater volume of bulk material, such as the granular load 22 shown in FIG. 1, than conventional conveyor belts, without danger of spillage. The portion of the belt between successive groups of troughing rolls sags in the middle under the weight of the load 22 sufficiently to offset partially or completely the tendency of the load to spread during passage over the troughing rolls. Conversely, with an equal load the troughing rolls can be more widely spaced.

The belt also utilizes the necessary materials with maximum efficiency, since the concentration of longitudinal reinforcement in the very edges eliminates the previous need for excess material to withstand temporary localized impacts or overloads.

The result is that a conveyor installation incorporating a belt of this new construction in any particular size can be expected to have not only a lower initial cost but also a greater carrying capacity than conveyors with belts of conventional constructions.

What is claimed is:

1. A conveyor belt consisting of longitudinal and transverse reinforcements embedded in elastomer, the belt having a body of approximately uniform thickness except at the edges, with the transverse reinforcements being extensible in the longitudinal direction of the belt, being spaced from the top and bottom surfaces and extending essentially from one edge to the other, the edges being substantially thickened on the top only of the belt and containing the essentially inextensible longitudinal reinforcements overlying the margins of the transverse reinforcements.

2. A belt as in claim 1, in which the transverse reinforcements comprise a pair of spaced plies of textile fabric resistant to transverse extension and compression.

3. A belt as in claim 2, in which the transverse reinforcements contain strong essentially inextensible yarns in the transverse direction of the belt and extensible yarns in the longitudinal direction.

4. A belt as in claim 3, in which the transverse reinforcements comprise a spaced pair of multi-ply fabrics having essentially uncrimped strong yarns in the transverse direction of the belt and highly crimped yarns in the longitudinal direction.

5. A belt as in claim 1, in which the longitudinal reinforcements at each edge of the belt comprise a cluster of nearly inextensible filaments.

6. A belt as in claim 2, in which the longitudinal reinforcements comprise wire cables.

7. A belt as in claim 4, in which the longitudinal reinforcements comprise wire cables.

8. A belt as in claim 2, in which the longitudinal reinforcements consist of a single wire cable at each edge.

9. A belt as in claim 4, in which the longitudinal reinforcements consist of a single wire cable at each edge.

* * * * *